United States Patent [19]
Taylor

[11] 3,981,661
[45] Sept. 21, 1976

[54] INJECTION CYLINDER UNIT, MOLD AND MOLD HANDLING APPARATUS

[76] Inventor: Don Allen Taylor, Box 4, 216 Mills St., Wadsworth, Ohio 44281

[22] Filed: May 27, 1975

[21] Appl. No.: 580,909

Related U.S. Application Data

[63] Continuation of Ser. No. 411,793, Nov. 1, 1973, abandoned.

[52] U.S. Cl. .............................. 425/247; 264/320; 425/DIG. 228
[51] Int. Cl.[2] ........................................ B29C 3/02
[58] Field of Search .. 425/246, 250, 251, DIG. 228; 264/319, 320, 323

[56] References Cited
UNITED STATES PATENTS

| | | | |
|---|---|---|---|
| 3,121,918 | 2/1964 | Jurgeleit | 425/190 |
| 3,121,919 | 2/1964 | Turner | 425/246 |
| 3,591,897 | 7/1971 | Perras | 425/250 |
| 3,833,330 | 8/1974 | Aoki | 425/247 |

FOREIGN PATENTS OR APPLICATIONS

| | | | |
|---|---|---|---|
| 1,965,779 | 12/1969 | Germany | 425/246 |
| 1,110,303 | 4/1968 | United Kingdom | 425/246 |

*Primary Examiner*—Francis S. Husar
*Assistant Examiner*—Robert J. Charvat

[57] ABSTRACT

A combination injection means, mold handling apparatus, and mold is disclosed which is capable of being attached to a conventional compression style press without undue modification thereof to thereby greatly enhance the efficiency thereof. The invention includes an injection cylinder and bracket means for attaching the same to the frame of the press without modification thereof and a manifold associated with the injection cylinder. A multi-plate mold structure is also disclosed which is capable of being incrementally indexed into and out of the press and also indexed into position for filling by the injection cylinder. Alternate mold assemblies are provided so that one can be located interiorly of the press for curing purposes, while the other is being stripped. A runner system is also provided in the manifold to enhance the efficiency of filling multiple mold cavities with a minimum of waste, and also means are disclosed for separating the press for removal of the cured part. The assembly thus disclosed has a capability of obtaining the advantages of both an injection system and a compression system. Additionally the sprues formed during molding are automatically removed, thereby effecting a great labor saving; and furthermore any work done with regard to the mold is done outside of the press area, thereby enhancing the safety properties.

19 Claims, 12 Drawing Figures

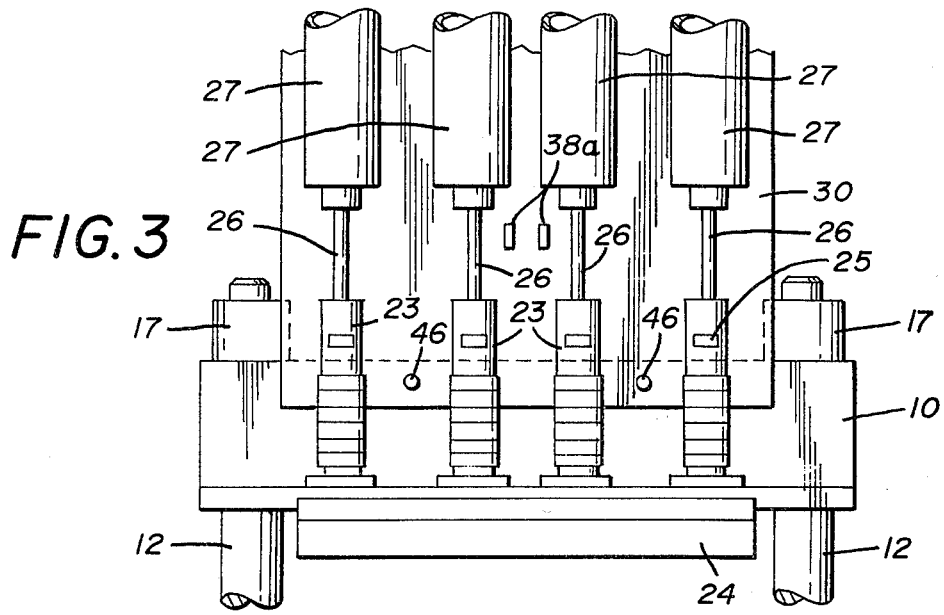
FIG. 3
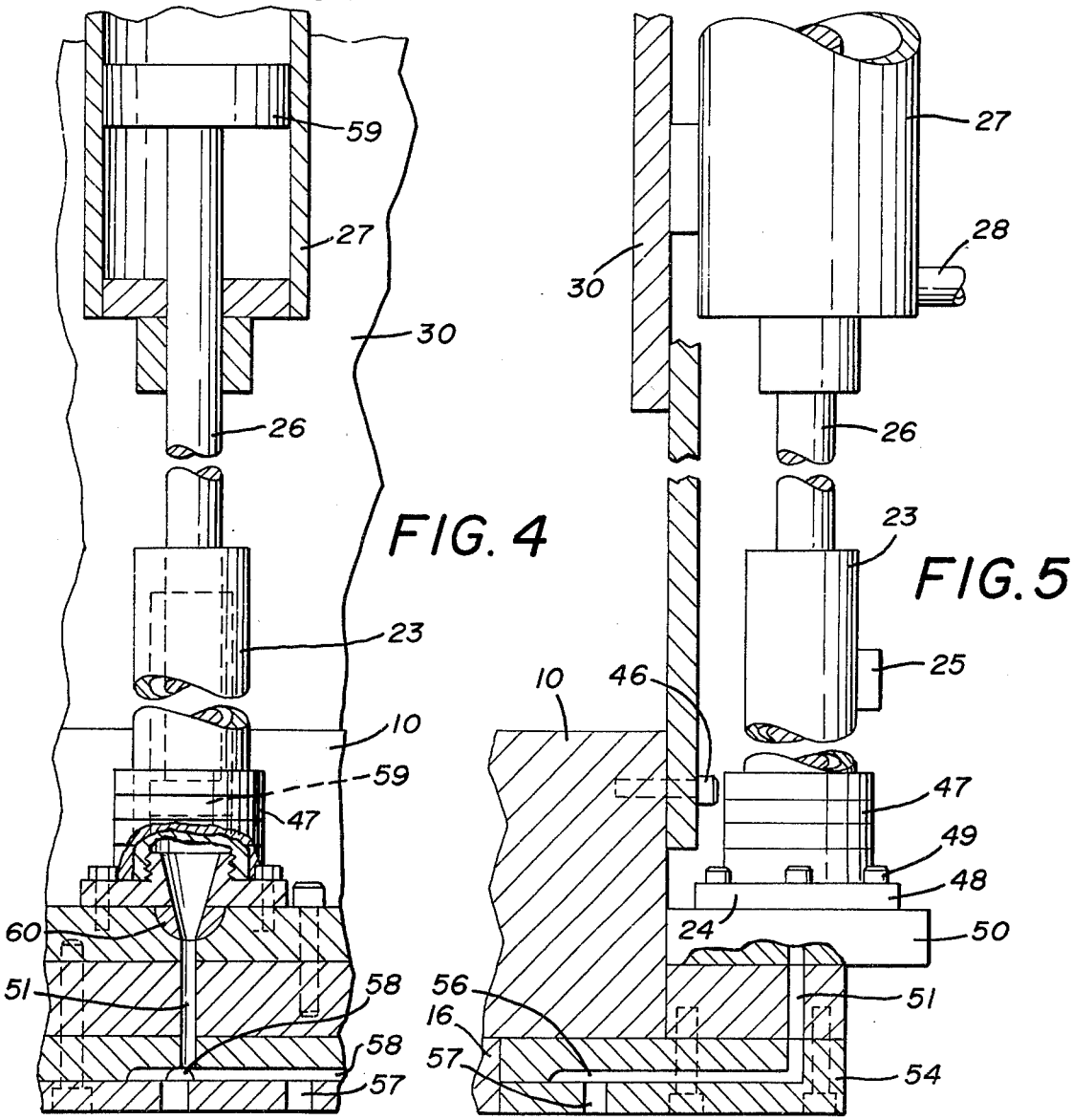
FIG. 4
FIG. 5

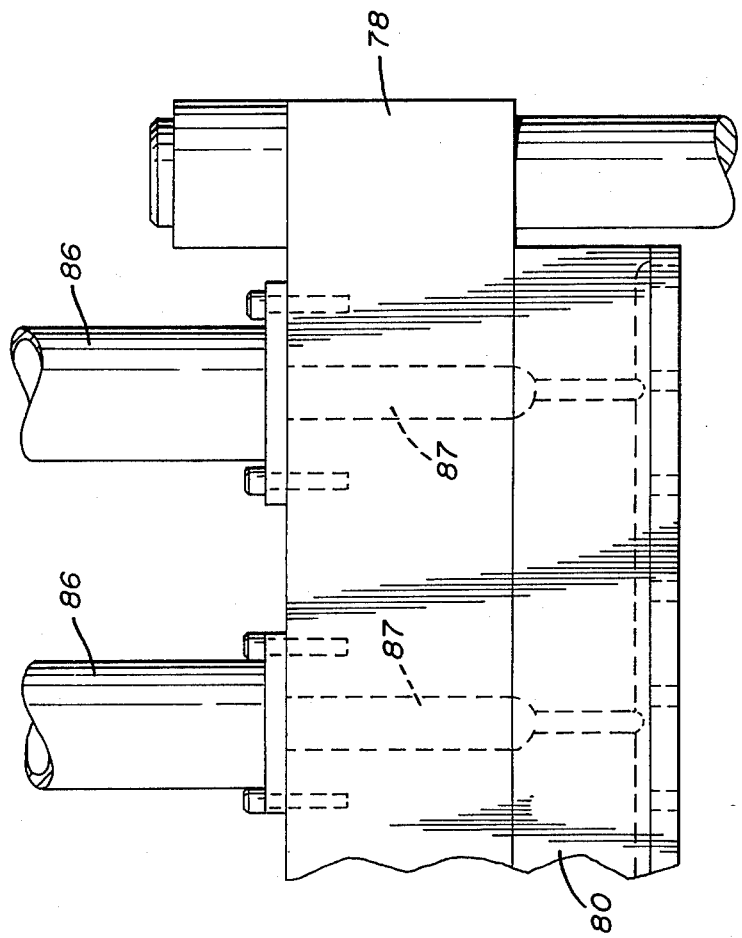
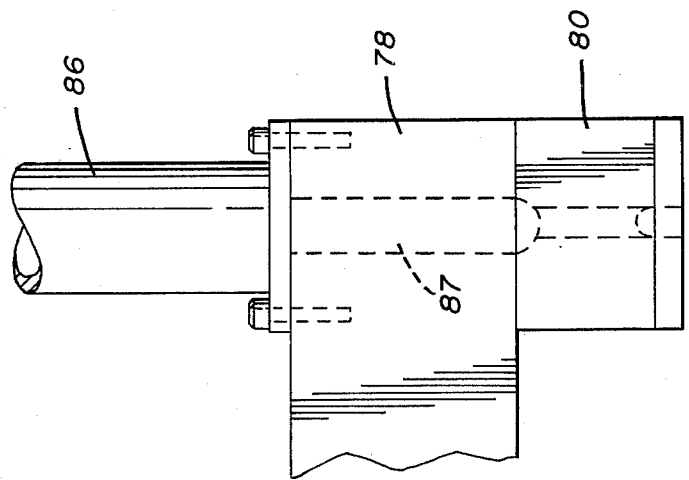
FIG. 12

INJECTION CYLINDER UNIT, MOLD AND MOLD HANDLING APPARATUS

RELATED APPLICATIONS

This application is a continuation of Applicant's earlier filed application, Ser. No. 411,793, filed Nov. 1, 1973, now abandoned, for "COMBINATION A INJECTION CYLINDER UNIT, MOLD AND MOLD HANDLING APPARATUS."

FIELD OF INVENTION

This invention relates to molding apparatus and, in particular, injection molding methods.

The invention is comprised of an injection unit, a mold, and mold handling apparatus in combination.

DESCRIPTION OF THE PRIOR ART

The three most commonly used molding methods known in the molding field are compression, transfer, and injection. All three of these methods have a number of disadvantages which seriously affect and limit the attainable productivity, safety, and profit contribution of the above-named current molding methods.

One of the major disadvantages of the forementioned molding methods is the great amount of material waste they generate.

In the compression method of molding this material waste is represented by the excess material left in the rind cavities (overflow cavities). The percentage of such waste can represent from 10 to 20% of the total material. The fact that this method of molding requires individual slug material preparation and the manual slug loading of each cavity completely nullifies the slightly lesser material waste material generation of this molding method.

In the transfer molding method both the transfer mold and the method known in the trade as the bottomless pot transfer method generate excessively high percentages of material waste due to recognizable and unpreventable phenomenal conditions, such as skin curing and the vulcanized material known as the pot waste pad, comprised of a necessary excess material and attached sprues. This is discarded total waste. The percentage of material waste recognizable as an unpreventable factor of the forementioned transfer method of molding is from 20 to 200% and often greater.

This understandably greatly minimizes or virtually eliminates the profitability of the molding operation in the use of the current transfer molding methods.

The waste material generation of the injection molding method is equally as great as the transfer method, the basic difference being the form of the cured and discardable waste material being a runner and sprue configuration instead of a transfer pad. This injection material waste factor commonly is 20 to 200% and likewise constitutes a very similar recognizable disadvantage of this molding method.

The conventional and currently used injection molding methods also have other serious disadvantages, one of the most prominent being that it is very difficult to control parameters due to the necessary unbalanced runner system (umbrella) and the difficulty of controlling the shear heat generated in the runner restrictions and the gate into the mold cavity due to the friction these restrictive channels and ports represent. This unavoidable condition recognized as a necessary part of the current injection molding method causes an erratic and undependable quality of molding, determined by the high percentage of defective molded parts, mainly due to lack of ability to completely fill all the cavities uniformly.

Another equally important disadvantage of the current and known injection molding method is that in its most common presently used form and method the injection unit, which is comprised of a material containing cylinder and a plunger pushing cylinder, is most always singular. That is, it is comprised of one unit. This fact greatly minimizes the amount of pre-plasticized material that can be injected into the mold per cycle, and such shot pounds per cycle usually range from a minimum of 6 lbs. to 14 lbs. in elastomers. This greatly limits the number of cavities curable each cycle and prevents the injection usage of large sized molds wherein if this was possible, much greater productivity would be achieveable.

Still another disadvantage in the current method of usage of compression, transfer, and injection molds is that due to their excessive weight and size they are most generally rigidly fixed in the press, and such an arrangement constitutes a great safety concern since the molds are manually serviced inside the clamp area of the press.

Another, but equally important, disadvantage of the current injection and transfer molding methods is that due to the high pressures of the material that is necessary to fill the cavities, the injection pressure often being as high as 20,000 PSI in the injection method compared to 2,000 PSI pressure of mold clamp required to maintain the mold tightly closed at the mold plates part line due to imperfections in the mold plate surfaces and/or the necessity to over inject the cavities to obtain complete fill of all the cavities, the mold plates are most frequently split apart causing the material to spew out of the cavity resulting in each molded part having an attached area margin of flash that requires a costly secondary operation to remove.

There are known molding methods that represent attempts to solve the several molding disadvantages referred to. The problem of high percentage waste material generation has been approached by the utilization of cold runner systems that still retain the disadvantage of difficult to control parameters of the injection molding method and excessively high mold cost due to the requirement of very elaborate special construction.

Attempts to eliminate the waste of the cured up pot pad in the transfer molding method result in a mechanically complex mechanism to discard the retained sprues and an equally costly and complex molding machine unit to eliminate such material pot waste.

The pot transfer method is a dependable, much used molding method, due to its unrequired runner system, having direct sprue entry into each cavity; but due to a non-runner and gate shear heat generation system and insufficient pressures required to generate this frictional shear heat, the required cure cycles are several times greater than in injection molding, directly reducing the level of achievable productivity.

There have been attempted solutions to this problem by retaining the runner and gate system, but to reduce the area of the same to overcome the problems identifiable in the runner area, the achievement has been very minimal.

In addition to the above-noted commonly used prior art, Applicant is also aware of the following patent prior art:

| | |
|---|---|
| Foerstner | U.S. Pat. No. 1,740,082 |
| Jurgeleit | U.S. Pat. No. 3,121,918 |
| Turner | U.S. Pat. No. 3,121,919 |
| Perras | U.S. Pat. No. 3,591,897 |
| Taylor | U.S. Pat. No. 3,748,075 |
| Aoki | U.S. Pat. No. 3,833,330 |

SUMMARY OF THE INVENTION

Therefore, it is the object of the present invention to provide a new combination of an injection unit, mold, and mold handling apparatus that eliminates many of the disadvantages of known molding methods and machines and affords a number of heretofore unattained molding advantages.

Another object of the invention is to provide a new means to greatly minimize the generation of waste material and to do so by the usage of a conventional molding press, in contrast to excessively expensive and highly specialized molds now necessary to achieve the same.

Another object is to provide an injection unit that is easily adaptable to a conventional compression press, thereby efficiently converting it to an injection machine with a minimum of modification thereto.

Another object related to the new and novel injection unit is to achieve the capability of much larger cavities and more cavities per mold to be used. Still another object of the invention is that the injection unit greatly reduces the area required in height or floor space.

Another object of the invention is to provide a means that makes it practical to convert the very vast existing inventories of both molds and compression style molding presses to very highly productive injection molding machines.

It is yet another object of the invention to afford a new molding method whereby parts can be molded nearly flashless and requiring no trimming, with such object being achieved without using the currently known method requiring very expensive specially constructed molds.

It will be understandable the invention accomplishes this by utilizing conventional and less expensive compression type molds.

Still another related object is that the invention provides means, by the mold construction, so that the minimal remaining cured sprues are extractable with the cured part, overcoming one of the main problems of discarding the cured sprue waste that is associated with one of the known methods of material waste minimization.

Yet another object of the invention is to provide mold handling and positioning apparatus to position the molds exteriorly from the main clamping area of the press to greatly improve and comply with safety standards and further improving working conditions. A related object of the invention is that the mold handling mechanism and the injection method operating simultaneously and in cooperation combines what are now two separable cyclic requirements, greatly minimizing cycle time and increasing productivity.

Another object of the invention is to provide an injection unit installation method that is entirely exterior of a press, being mountable to a conventional press head and not requiring any boring of holes into the head which would affect the strength of the press head.

Still another object is to provide a very high material poundage capability injection unit that is comprised of multiple injection cylinders feeding material into a singular manifold that is positioned to be within the main clamp area. Of great novelty and importance is that such a new design enables the very high injection pressures to be withstood. This eliminates a major problem of known injection methods wherein the injection method requires material to horizontally contact the edge of the molds causing conditions of inability of mold and press to withstand this required high pressure of injection. Therefore, the full and desired highest pressures of injection cannot be utilized, minimizing its efficiency.

Another object of the invention is that the injection and mold movement methods as shown provide constant productivity with one mold to be in a constant cure cycle. This is a very important advantage as it affords the practicality of converting existing presses to highly productive molding machines comparable to several times more costly and greater space requiring rotative constant productive type molding machines.

Many other objects and advantages of the invention will become apparent from the description and accompanying drawings illustrating certain embodiments of the invention.

OF THE DRAWINGS:

FIG. 3 is a front elevational view of injection units and manifold.

FIG. 4 is an enlarged front elevational view of an injection unit and manifold.

FIG. 5 is an enlarged side elevational view of an injection unit and manifold.

FIG. 6 is a view of a mold sliding mechanism taken on line 6—6 of FIG. 1.

FIG. 12 is a partial side elevational sectional view of still another installation method of injection cylinder unit.

BRIEF DESCRIPTION OF THE PREFERRED EMBODIMENTS

Figure 1:
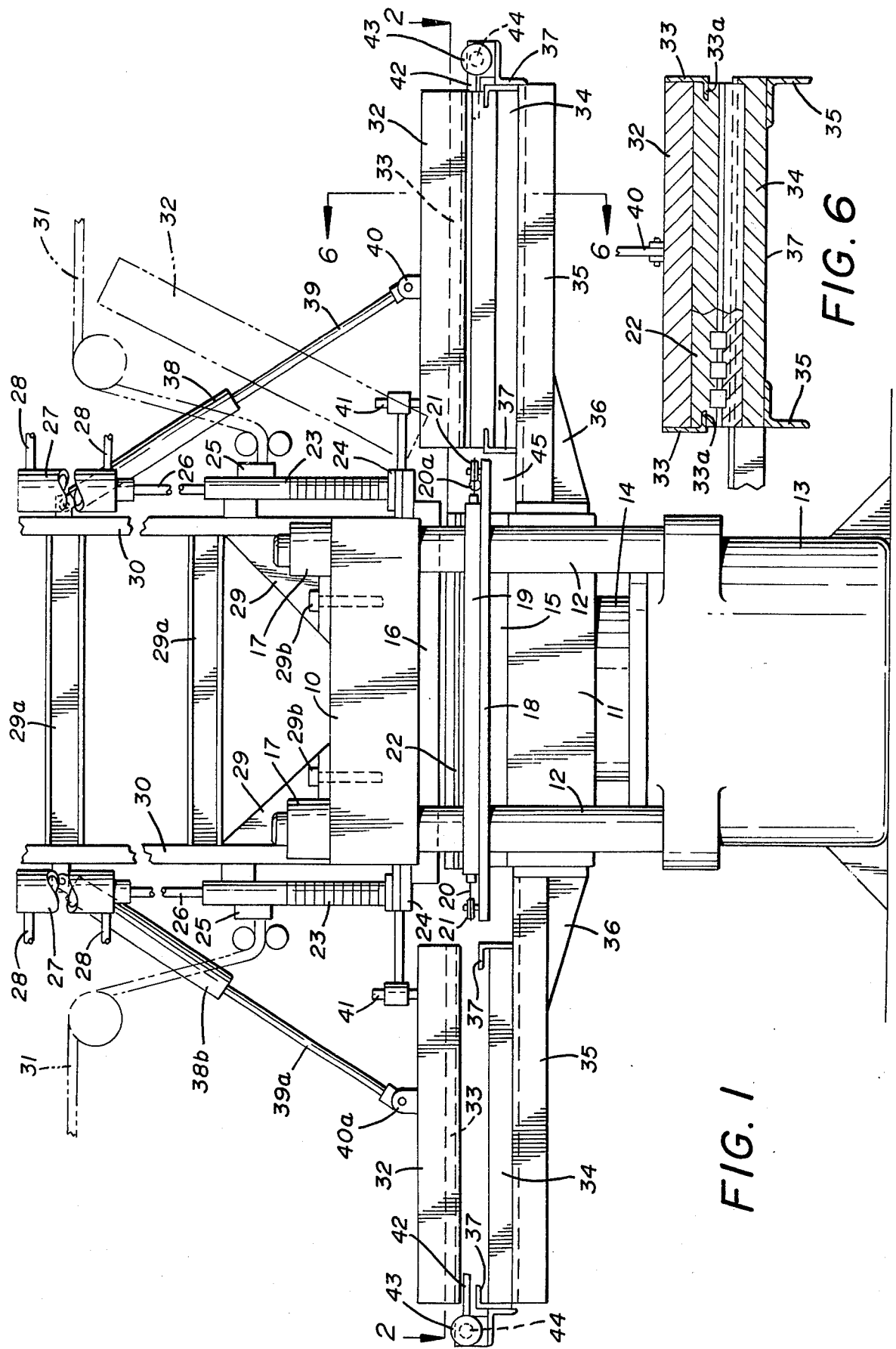
FIG. 1 is a side elevational view of a conventional strain rod type press with injection units and mold handling apparatus attached in accordance of invention.
Figure 2:
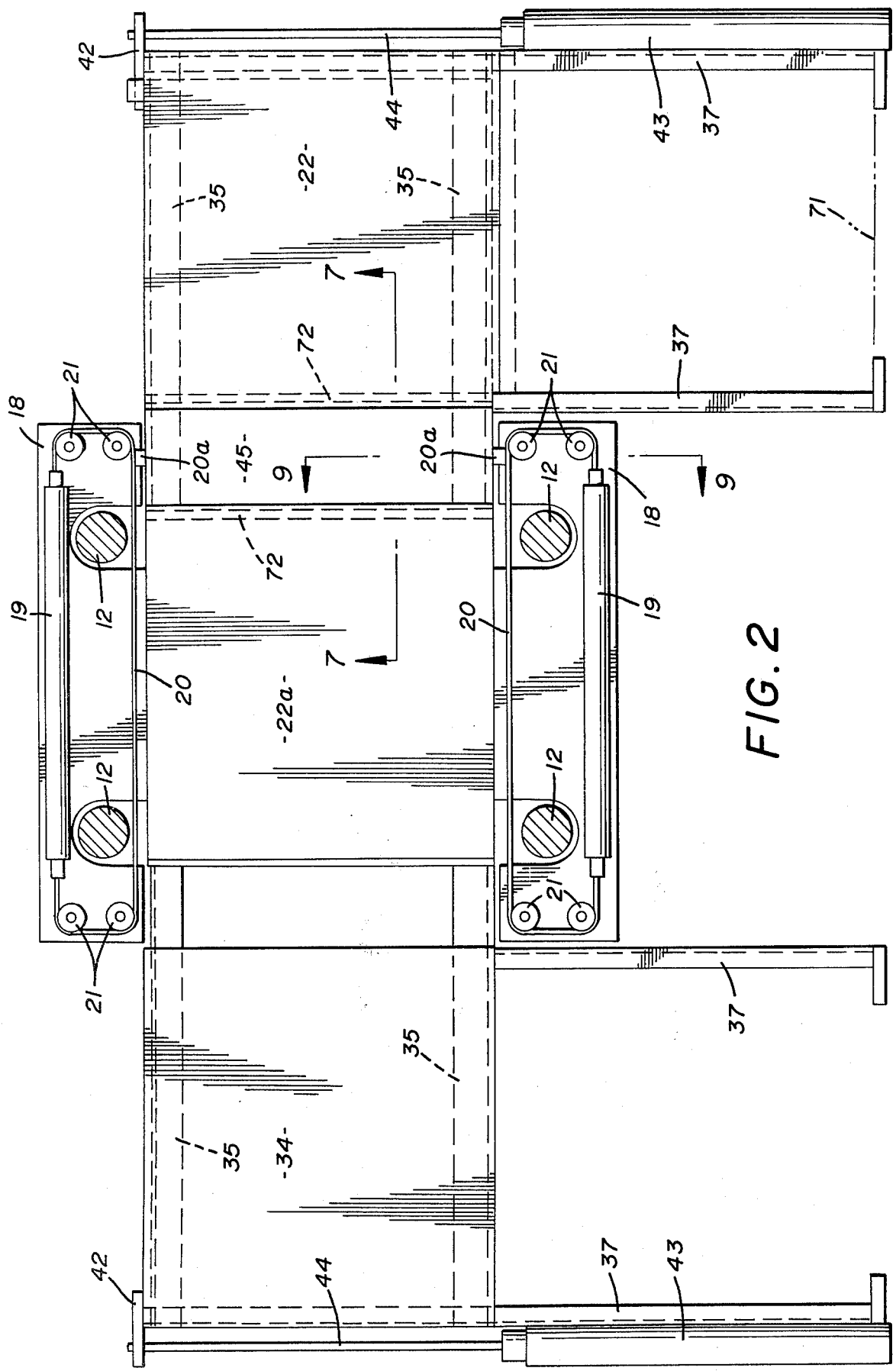
FIG. 2 is a plan view of the press taken at line 2—2 of FIG. 1.

Referring to FIGS. 1 and 2, the conventional strain rod type compression press is comprised of a ram pot 13 supporting a head member 10 on four strain rods 12. The pot 13 has a ram 14 slidably and internally positioned and supporting a bolster 11 on which is a heated platen 15. When hydraulic oil or water pressure is forced into the pot 13, the ram 14 is forced upward out of the pot pressurizing a mold carried between bottom bolster 11 and platen 15 and head 10 and platen 16.

Located on one or both sides of the press head is a bracket 30 being fixed by proper cross braces 29a,29a and brackets 29 and bolts 29b,29b to press head 10. Suitably mounted to bracket plate 30 is a hydraulic double acting push cylinder 27 having inlets and outlets 28 through which pressurized hydraulic oil or water is forced, thereby activating said cylinder which in turn moves cylinder rod 26 to which is fitted a piston plunger 59 enclosed in the heated injection cylinder 23, from which a nozzle 60 injects the plasticized material 31 and 88 into the manifold 24 which has a runner system 58 that communicates pressurized material 88 into sprues 67 of mold 22 through a sprue plate 54 that registers with sprues 67 of mold 22 and sprues 57 of sprue plate 54. Referring again to FIGS. 1 and 2, the two separable but joined molds 22 and 22a are separated by a spacer block 45, the center of which has an attaching block 20a that fixes a wire cable 20 to it. This cable is moved by a hydraulic cable cylinder 19 that is mounted on bracket plate 18 which also carries pulley guide wheels 21.

It is understandable that this described mechanism efficiently moves the two-mold assembly 22, 45, and 22a laterally in and out of the press in an alternating way, so that when one of the molds 22a is located in the press in the required position of clamp for the curing cycle, the other mold 22 is extended outwardly of the press on guide slides 33 in between heated plantes 32 and 34. This is to prevent a loss of temperature of the mold when it is exposed outwardly of the press for the demolding of the completed vulcanized parts.

To give access to the mold 22, the three-piece mold, comprised of a top plate 25, a center plate 70, and a bottom plate 71, is separable. The top plate 25 of mold 22 has a channel groove 33a that rides in an angle 33 that is fixed to top heated platen 32. Spacer block 45 has a dovetail slide 72. When the mold opening cylinder 38, which is provided with a rod 39 which is fixed pivotally as at 40 to heating plate 32, is pressurized and rod 39 is withdrawn into cylinder 38, the reaction with the hinge assembly 41 cooperating is that the top plate of mold 22 is lifted upwardly and angularly as illustrated by dotted line 32. This permits demolding of the molded parts exteriorly from the press thus complying with the new safety standards.

The molds 22 and 22a as shown and described are three-piece or plate molds but can be of any mold design. In case of a three-piece mold often the center plate contains the finished vulcanized parts, and it is desirable to remove the cured parts in an automated way known to the trade as knockouts or a mold sweep removal method. To provide for this, the mold slide out bracketery has additional slide angles 37 which permit the slidable engagement of the mold plate edge that is necessary to expose it to the knockout mechanism (not shown). To move this mold plate sideways, an hydraulic cylinder 43 is fitted with a rod 44 to which is attached at its end a finger 42. It is realizable that once the cylinder 43 is energized and the rod 44 withdrawn, the plate riding on slide angles 37 will be moved to the furthest point on the slide extensions 37.

In operation of the injection device and the mold as the initial start-up cycle is initiated, the side cable cylinders 19 are pressurized, withdrawing one of the molds into the press in a step manner as follows. The mold cavity sprues, which are of preferably, but not restricted to, one row of cavities of the mold, are indexingly aligned with the injection manifold sprues by a sprue plate 54 (see FIG. 7). This plate, being removable, can register the sprues of most any mold cavity layout pattern.

The mold moving cable cylinders 19, being synchronized with the press main clamp cylinder 13, allow the mold to be slid into precise registry as the clamp pressure of the press is slightly relieved and a minute clearance is provided. After mold and injection manifold sprue 67 and 57 registration has been established, clamp of press is again developed, and manifold 24 is firmly and positively clamped between press head 10 and bottom platen 15 with mold 22 or 22a located in between injection manifold 24 and platen 15.

The manifold 24 and the mold 22 being so pressurized develops positively sealed sprues that permit the highly pressurized material 88 to be injected through the aligned sprues 57 and 67 and into the cavities 69 of center plate 70 by a gate 68.

It is realizable that, with only a limited number of the total number of cavities of the mold being injected at one time, the pressure ratio in pounds per square inch between the clamp pressure and the very high injection pressure is greatly increased far greater than the conventional ratio of 2 to 1 to a ratio of 10 to 1, achieveable by the aforedescribed injection method as taught by the invention.

This method of injection makes it possible to cure parts virtually flash free which is an important advantage of the invention and especially so in consideration that conventional molds are usable and made capable of producing vulcanizates virtually flash free.

The injection of material into only a selective portion of the mold cavities at a time affords another advantage in assuring the complete fill of all the mold cavities, providing a solution to the known injection methods that attempt the injection of all the cavities of the mold at one time by a centrally located single main sprue nozzle and by a runner system. Often this method results in only partial fill of some of the cavities.

The invention described and claimed, which does not have a pot as in the transfer system or a runner system as in known injection methods, develops material waste consisting of only the sprues 67 which represents only a fractional amount of the overall part weight.

The mold is progressively and intermittently moved into the press clamp with single rows of cavities being filled at one time until all of the mold cavities have been injected with the material and the mold finally clamped and fully pressurized between the platens 16 and 15 which are heated to the required curing temperature by electric elements 73 or, if desired, steam cored channels. During the progressive injection cycle and the indexing of the mold 22 in the press, the opposite mold 22a is extended fully from the press to a position on the opposite side of the press.

INJECTION UNIT AND INJECTION MANIFOLD

The injection unit is comprised of an injection cylinder 23 which is heated by band type heating electric elements 47. The material 88 is pressurized by a piston plunger 59, and the nozzle 60 is aligned with a sprue 51 that feeds the material into a runner system 56 and 58 in the manifold and into secondary sprues 57 that are aligned with mold sprues 67.

The injection manifold 24, which extends into the clamp area, is constructed of plate 50 and a removable sprue plate 54 that are bolted together by bolts 66. The injection cylinder plasticizes the material and retains it at a temperature under vulcanization or scorch temperature. The material is also retained in the manifold 24 in this unvulcanized state.

To insulate the manifold 24 from the press platen 16, which has electric heating elements 73 that heat it to full vulcanization temperature, an insulation 65 and 63 is provided. The desired temperature of the material is further maintained by water circulating in core channels 61.

THE MOLD

Figures 7, 8:
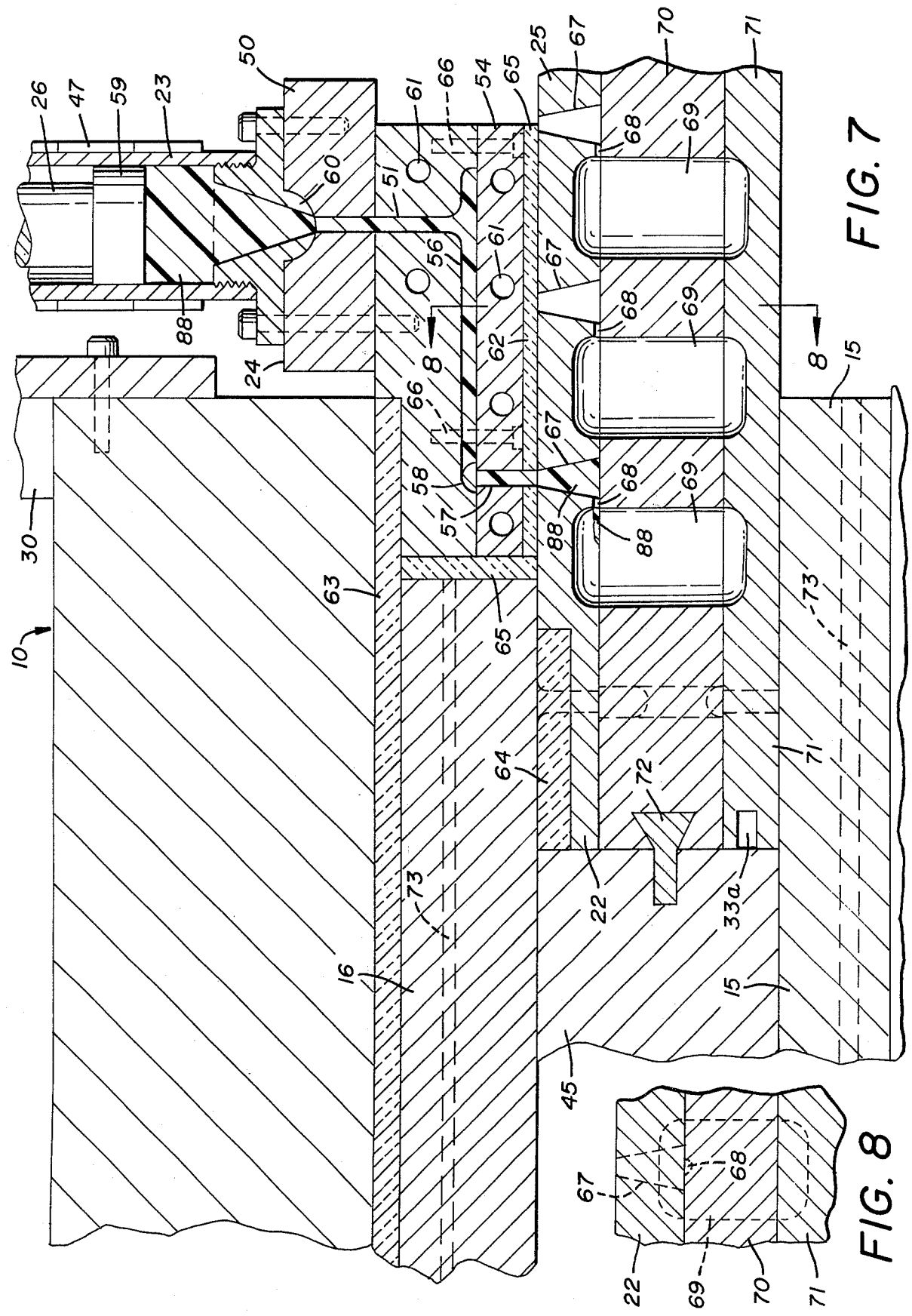
FIG. 7 is an enlarged fragmentary side sectional view of injection cylinder, manifold, mold, and press head taken on line 7—7 of FIG. 2.
FIG. 8 is a sectional view of sprue and cavity of a mold taken on line 8—8 of FIG. 7.
Figure 9:
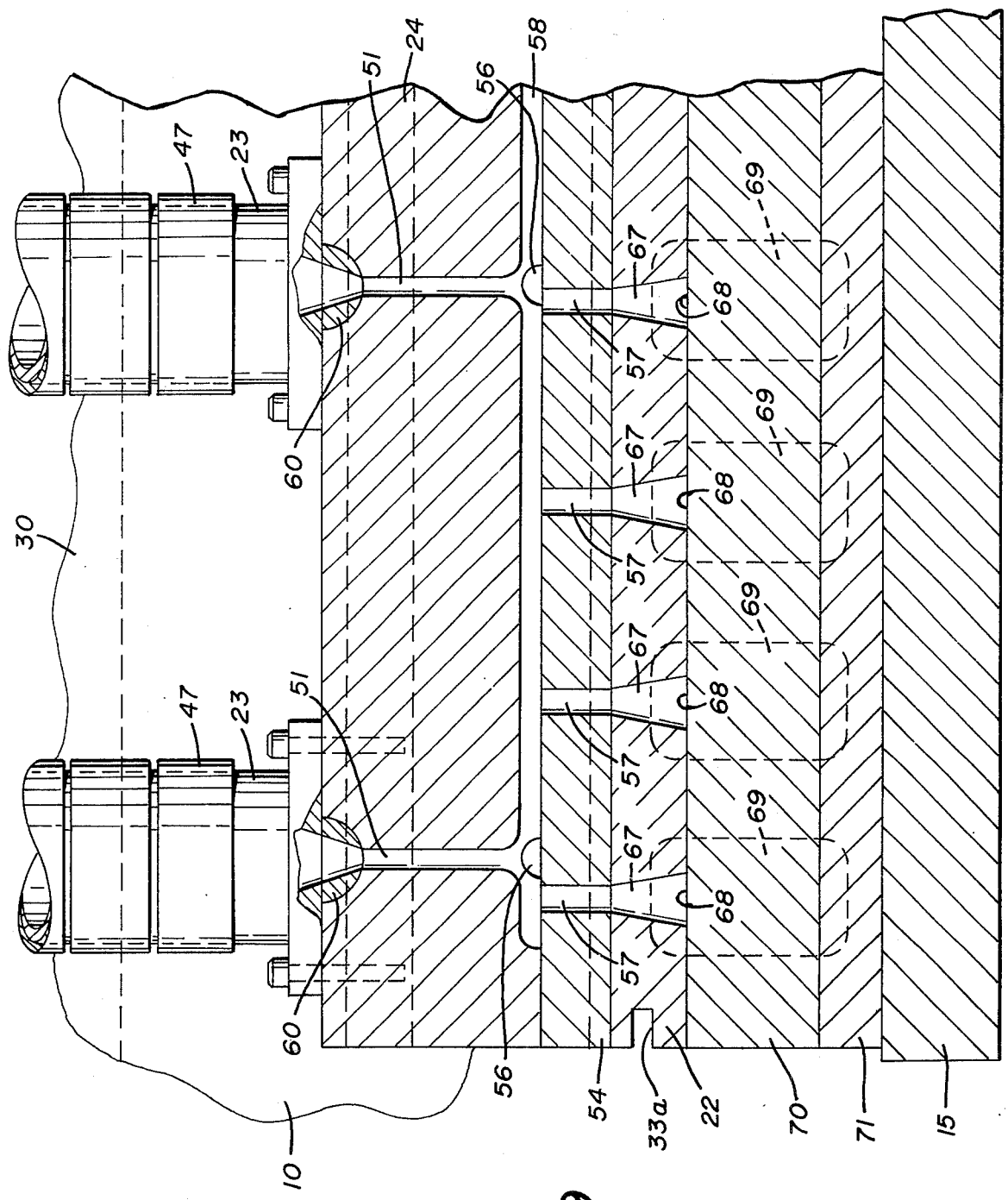
FIG. 9 is an enlarged fragmentary sectional view of injection cylinder, manifold, mold, and press head taken on line 9—9 of FIG. 2.

Referring to FIGS. 7 and 9, the molds 22 and 22a have sprues 67 that have a smaller diameter at the top and a larger diameter at the bottom. This reverse draft configuration enables the sprue 67 to be extracted from the mold with the vulcanized part 88a.

The mold 22 has an insulation pad 64 at each end to protect manifold material from mold or vulcanization temperature.

Referring to FIG. 3, the injection unit is shown comprised of multiple injection cylinders 23 that feed the pressurized material into a common manifold 24. Such a method provides the new means that enable a greatly increased poundage of material to be injected per cycle, allowing the usage of larger molds with a greater number of cavities achieving a higher molding productivity.

MODIFICATIONS

Figure 10:
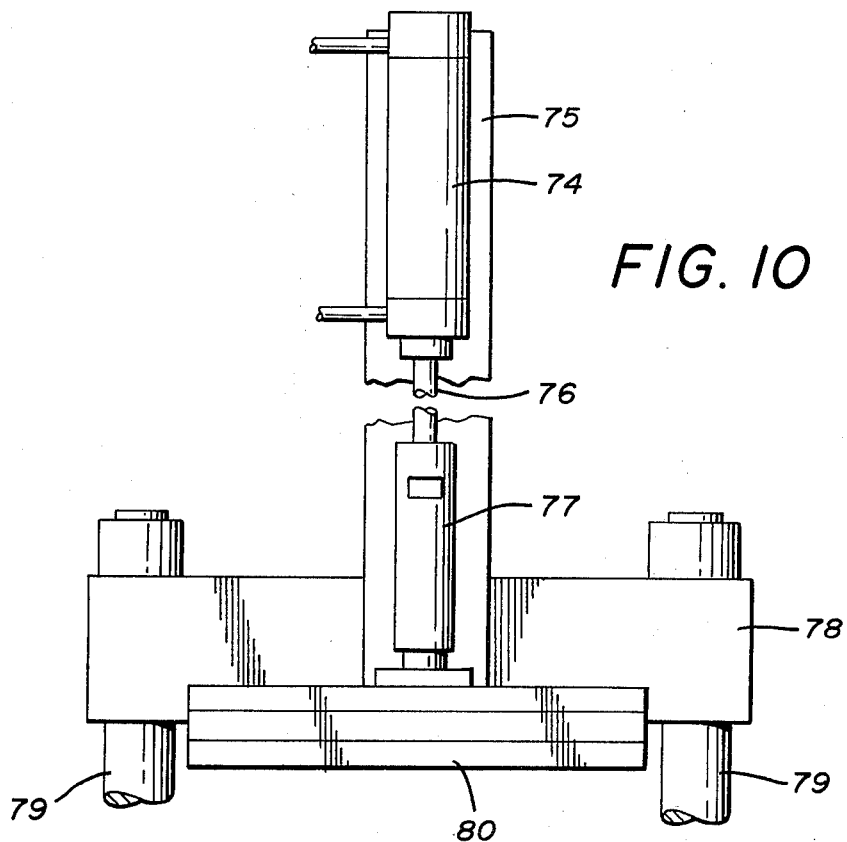
FIG. 10 is a partial front elevational view of a different embodiment of an injection cylinder unit.
Figure 11:
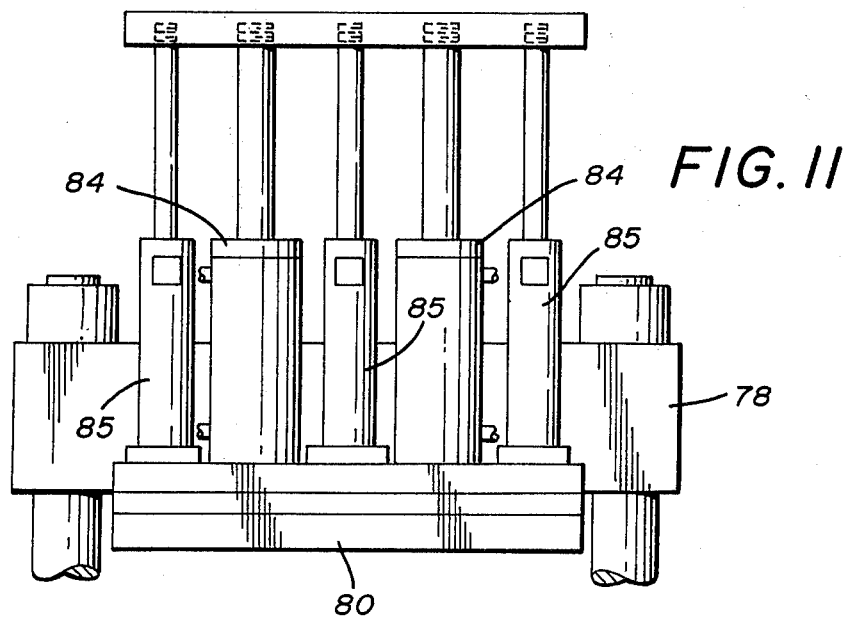
FIG. 11 is a partial front elevational view of another embodiment of an injection cylinder unit.

FIGS. 10 and 11 illustrate another embodiment in which the single injection cylinder 77, cylinder rod 76, and push hydraulic cylinder 74, and mounting bracket 75 securely fastened to the press head 78, which is supported by strain rods 79, provides material to the multiple sprued manifold 80.

FIG. 11 shows another injection unit embodiment in which multiple injection cylinders 85 and multiple push cylinders 84 are positioned in a parallel arrangement. Such an arrangement desirably reduces the injection unit height requirements which is necessary for low ceiling installations.

Still another embodiment is shown by FIG. 12, in which the injection unit installation is comprised of injection cylinders 86, with nozzles 87 communicating through holes bored in the press head 78 with the injection manifold 80.

What is claimed is:

1. An injection cylinder unit, mold, and mold-handling apparatus in combination with a compression press having a frame and relatively movable upper head and bottom bolster with upper and lower platens attached thereto, comprising;
   A. at least one vertically disposed material heating, plasticizing and injection cylinder assembly disposed adjacent to the frame of the compression press exteriorly thereof;
   B. a material distributing and storing manifold communicating with said injection cylinder;
   C. said manifold having at least one material outlet sprue;
   D. at least one multi-cavity mold having a plurality of sprue openings therein for communication with said material outlet sprue of said manifold; and
   E. means connected to said mold for incrementally indexing said mold from a position between the upper and lower platens of said press to a position exteriorly thereof whereby said sprue openings of said mold can be selectively moved into communication with said material outlet sprue of said manifold.

2. The unit of claim 1 wherein at least a portion of said material distributing manifold extends inwardly into the clamping zone of said press.

3. The unit of claim 1 wherein said manifold has substantially flat parallel top and bottom surfaces, with said top surface contacting the upper head of said press and said bottom surface contacting the top of said bottom bolster of said press when said press is in closed condition.

4. The unit of claim 1 wherein
   A. said manifold has a runner system therein and a plurality of material outlet sprues in communication therewith;
   B. gate means communicating with said material outlet sprues;
   C. said mold having a plurality of mold cavities communicating with said gate means
      1. whereby material from said injection cylinder fills each said cavity as said mold is indexed between said platens.

5. The unit of claim 2 wherein insulating means are carried by the inwardly extending portion of said manifold.

6. The unit of claim 1 wherein said manifold has a plurality of liquid circulating cooling channels contained therein.

7. The unit of claim 4 wherein
   A. said mold has a plurality of sprue openings communicating with said gate means and said mold cavities;
   B. said sprue holes of said mold having a smaller diameter at the top than at the bottom.

8. The unit of claim 1 wherein said mold has an insulating member carried on at least a portion of its upper surface.

9. The unit of claim 1 wherein
   A. said means for indexing said mold include a mold supporting slide and support means which is mounted exteriorly of said press;
   B. said mold being received on said slide and support means and being slidably movable from between said platens on said support means.

10. The unit of claim 9 wherein upper and lower mold heating platens are carried by said mold slide and support means for contact with said mold when the same is positioned exteriorly of said press.

11. The unit of claim 1 wherein
    A. said mold includes upper and lower mold plates; and
    B. means attached to said frame of said press and said upper mold plate for separating said upper mold plate from said bottom mold plate when said mold is positioned exteriorly of said press.

12. The unit of claim 1 wherein
    A. said cylinder means has a dispensing nozzle secured thereto;
    B. said manifold having a plurality of sprue holes therein for communication with said nozzle.

13. The unit of claim 1 wherein said cylinder means include a plurality of unaligned material heating, plasticizing, and injection cylinders and actuating push cylinders which are secured exteriorly to said frame of said press in parallel arrangement.

14. An injection cylinder unit, mold, and mold-handling apparatus in combination with a compression press having a frame and relatively movable mold sections carried thereby, comprising;
   A. at least one material heating, plasticizing and injection cylinder assembly disposed adjacent to the frame of the compression press exteriorly thereof;
   B. a material distributing and storing manifold communicating with said injection cylinder;
   C. said manifold having at least one material outlet sprue;
   D. at least one mold having a plurality of sprue openings therein for communication with said material outlet sprue of said manifold; and
   E. means connected to said mold for incrementally indexing said mold from a position between the relatively movable mold sections of said press to a position exteriorly thereof whereby said sprue openings of said mold can be selectively moved into communication with said material outlet sprue of said manifold.

15. The unit of claim 14 wherein at least a portion of said material distributing manifold extends inwardly into the clamping zone of said press.

16. The unit of claim 14 wherein said manifold has substantially flat parallel top and bottom surfaces, with said top surface contacting the upper head of said press and said bottom surface contacting the top of said bottom bolster of said press when said press is in closed condition.

17. The unit of claim 14 wherein
   A. said means for indexing said mold include a mold supporting slide and support means which is mounted exteriorly of said press;
   B. said mold being received on said slide and support means and being slidably movable from between said platens on said support means.

18. The unit of claim 14 wherein
   A. said mold includes upper and lower mold plates; and
   B. means attached to said frame of said press and said upper mold plate for separating said upper mold plate from said bottom mold plate when said mold is positioned exteriorly of said press.

19. An injection cylinder unit, mold, and mold-handling apparatus in combination with a compression press having a frame and relatively movable mold sections carried thereby, comprising;
   A. at least one material heating, plasticizing and injection cylinder assembly disposed adjacent to the frame of the compression press exteriorly thereof;
   B. a material distributing and storing manifold communicating with said injection cylinder;
   C. said manifold having at least one material outlet sprue;
   D. at least one multi-cavity mold having a plurality of sprue openings therein for communication with said material outlet sprue of said manifold;
   E. means connected to said mold for incrementally indexing said mold from a position between the relatively movable mold sections of said press to a position exteriorly thereof whereby said sprue openings of said mold can be selectively moved into communication with said material outlet sprue of said manifold.

* * * * *